May 9, 1933.                S. L. HJERMSTAD                1,908,423
                              GEAR SHIFT LEVER
                           Filed Oct. 21, 1931          3 Sheets-Sheet 1
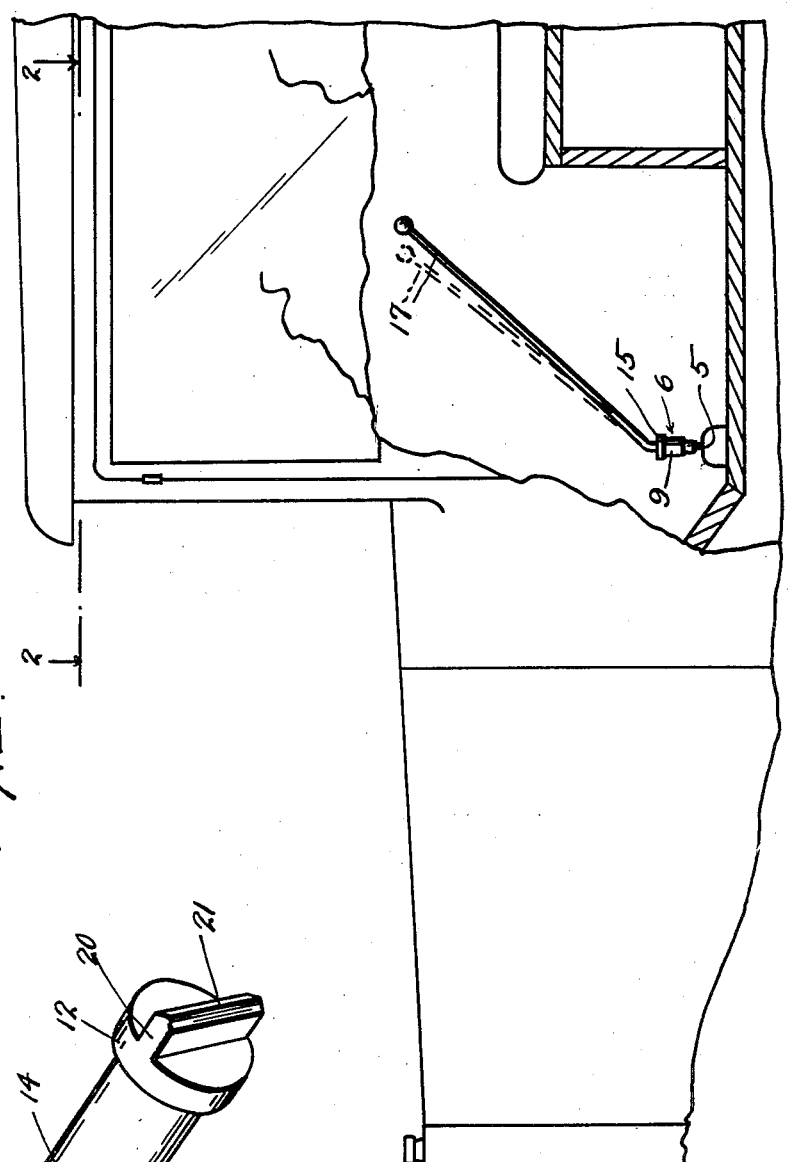
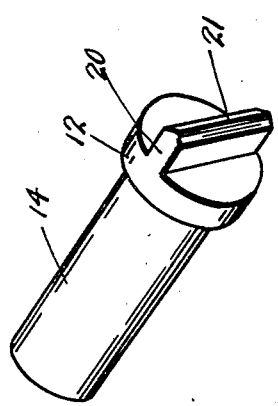
Inventor
*Selmer L. Hjermstad*
By *Clarence A. O'Brien*
                              Attorney

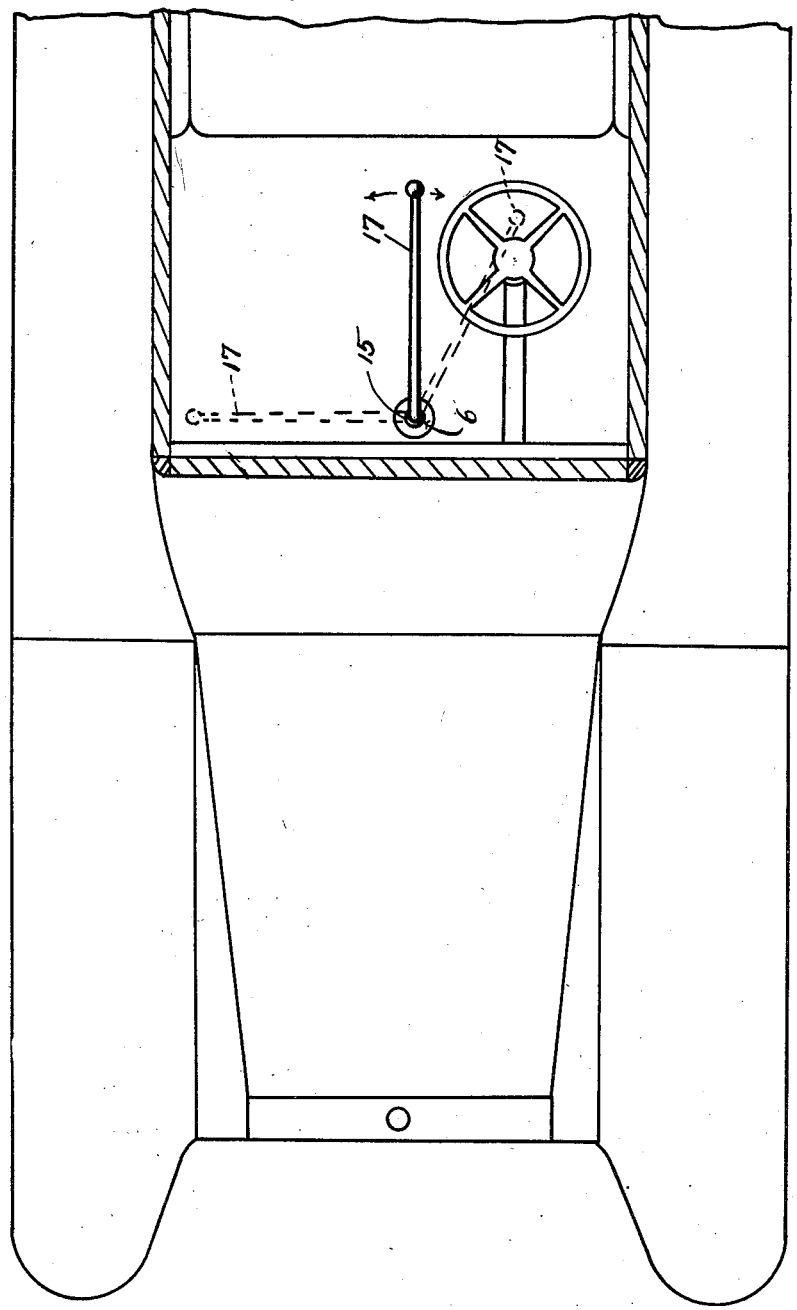

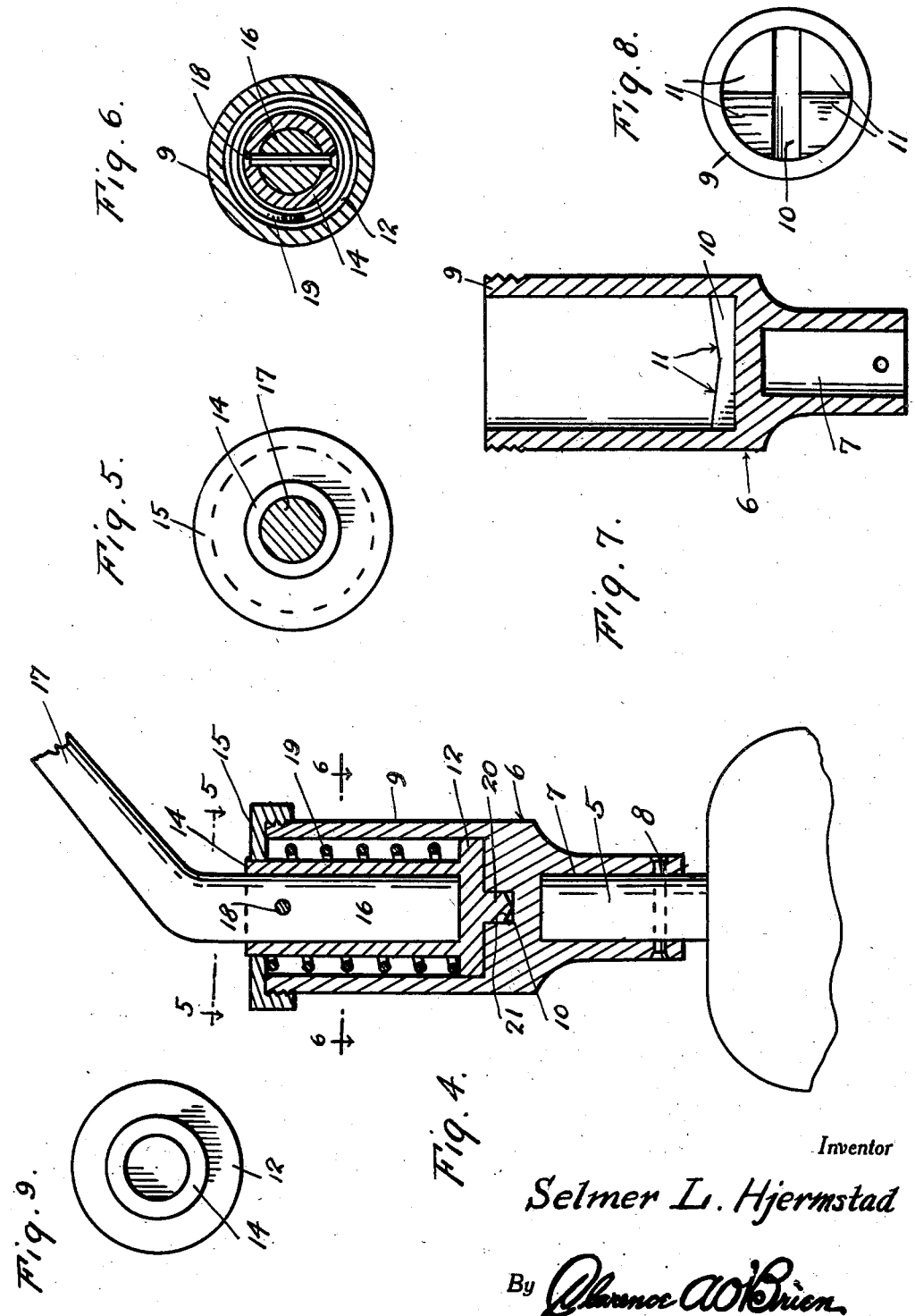

Patented May 9, 1933

1,908,423

UNITED STATES PATENT OFFICE

SELMER L. HJERMSTAD, OF WALLACE, SOUTH DAKOTA

GEAR SHIFT LEVER

Application filed October 21, 1931. Serial No. 570,185.

The present invention relates to lever constructions and particularly to a gear shift lever for an automobile and has for its prime object to provide means whereby the lever may be swung to an out of the way position and enable freer use of the front seat compartment of an automobile and permit the driver to get in and out of his place more readily.

Another very important object of the invention resides in the provision of a gear shift lever of this nature which is simple in construction, inexpensive to manufacture, strong and durable, easy to manipulate, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a fragmentary sectional elevational view of an automobile showing my lever in place.

Figure 2 is a horizontal section taken substantially on the line 2—2 of Figure 1.

Figure 3 is a perspective view of a rockable and sliding member.

Figure 4 is a vertical section through the lower portion of the device.

Figure 5 is a sectional view taken substantially on the line 5—5 of Figure 4.

Figure 6 is a sectional view taken substantially on the line 6—6 of Figure 4.

Figure 7 is a sectional view through the adapter.

Figure 8 is a top plan view thereof, and

Figure 9 is a bottom plan view thereof.

Referring to the drawings in detail it will be seen that the numeral 5 denotes the gear shifting member, 6 denotes an adapter having a socket 7 in the lower end thereof to fit over the member 5 and to be secured thereto by the pin 18. The upper portion of the adapter has a cylindrical recess 9, the bottom of which is formed with a diametrically extending groove 10. The bottom is slanted inwardly as indicated at 11 to a diameter of the bottom running transverse of the groove 10. Numeral 12 denotes a disk slidable and rotatable in the recess 9 and having a socket 14 rising therefrom of smaller diameter than the disk and extending up through an opening in the center of a cap 15 threaded on the upper end of the adapter and closing the open end of the recess 9.

The lower end 16 of a lever 17 is disposed at an acute angle to the lever and is fixed in the socket 14 by suitable means 18. A spring 19 is disposed about the socket 14 and is confined between the cap 15 and the disk 12. On the bottom of the disk is a diametrically extending rib 20, the lower longitudinal edges of which are beveled as indicated at 21. When this rib is disposed in the groove 10 in the bottom of the recess 9 the lever is held against rotation relative to the adapter and may be manipulated like any ordinary gear shift lever. When it is desired to swing the lever out of the way the lever is raised against the tension of the spring 19 so as to lift the rib 20 from the groove 10 and then the lever is swung or rotated to one side and released. When the lever is thus released the tension of the spring 19 will cause the rib 20 to slide down the inclined surfaces 11 until the rib assumes a position across the groove 10 and at right angles thereto. Because of the tension of the spring and the described formation of the coacting parts the lever will stay in this position until manually swung or rotated back to gear shifting position.

It is thought that the construction, operation, utility and advantages of this invention will now be quite apparent to those skilled in this art without a more detail description thereof.

The present embodiment of the invention has been described in considerable detail merely for the purposes of exemplification since in actual practice it attains the features of advantage enumerated as desirable in the statement of the invention and the above description.

It will be apparent that changes in the details of construction and in the combination and arrangement of parts may be resorted to without departing from the spirit or scope of the invention as hereinafter claimed or sacrificing any of its advantages.

Having thus described my invention, what I claim as new is:

1. Means for mounting a lever on a shiftable member so that said lever may be rotated relative to the shifting member from side to side, said means comprising an adapter having a socket receiving said shiftable member and fixed thereto and a cylinder, a body on the lever slidable and rotatable in the cylinder, said body being in the form of a disk having a socket rising therefrom and receiving a portion of the lever which is fixed therein, a cap on the cylinder through which the last mentioned socket extends, a spring about the last mentioned socket impinging against the cap and the disk for resisting relative movement of the lever and shifting member, the cylinder having a bottom formed with a diametrically extending groove, and a rib on the bottom of the disk engageable in the groove.

2. Means for mounting a lever on a shiftable member so that said lever may be rotated relative to the shifting member from side to side, said means comprising an adapter having a socket receiving said member and fixed thereto and a cylinder, a body on the lever slidable and rotatable in the cylinder, said body being in the form of a disk having a socket rising therefrom receiving a portion of the lever which is fixed therein, a cap on the cylinder through which the last mentioned socket extends, a spring about the last mentioned socket impinging against the cap and the disk for resisting relative movement of the lever and shifting member, the cylinder having a bottom formed with a diametrically extending groove, and a rib on the bottom of the disk engageable in the groove, said bottom of the cylinder having surfaces inclining inwardly and downwardly toward a diametric line transverse to the groove for guiding the rib into position transverse of the groove when the lever is rotated relative to the shifting member.

In testimony whereof I affix my signature.

SELMER L. HJERMSTAD.